UNITED STATES PATENT OFFICE.

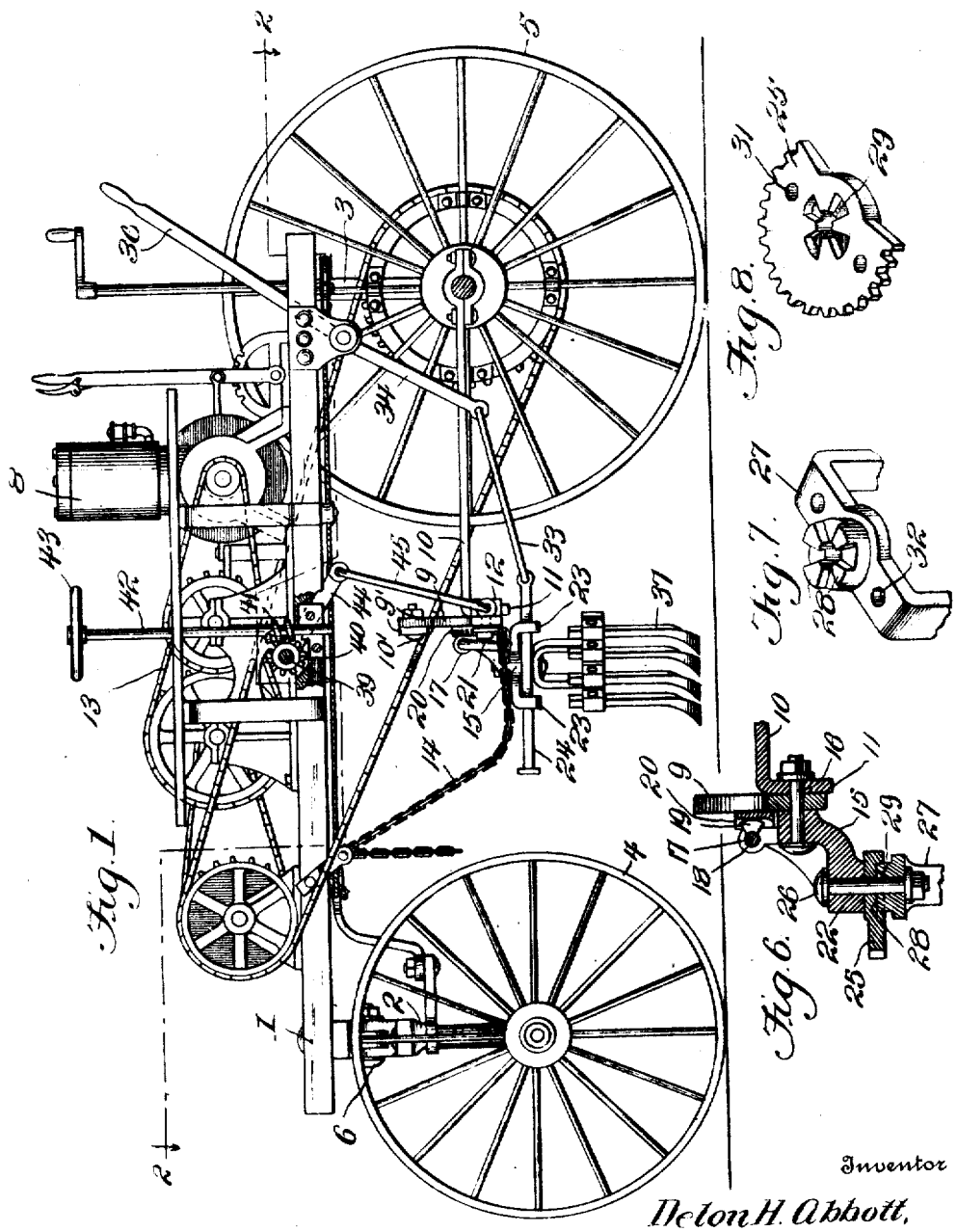

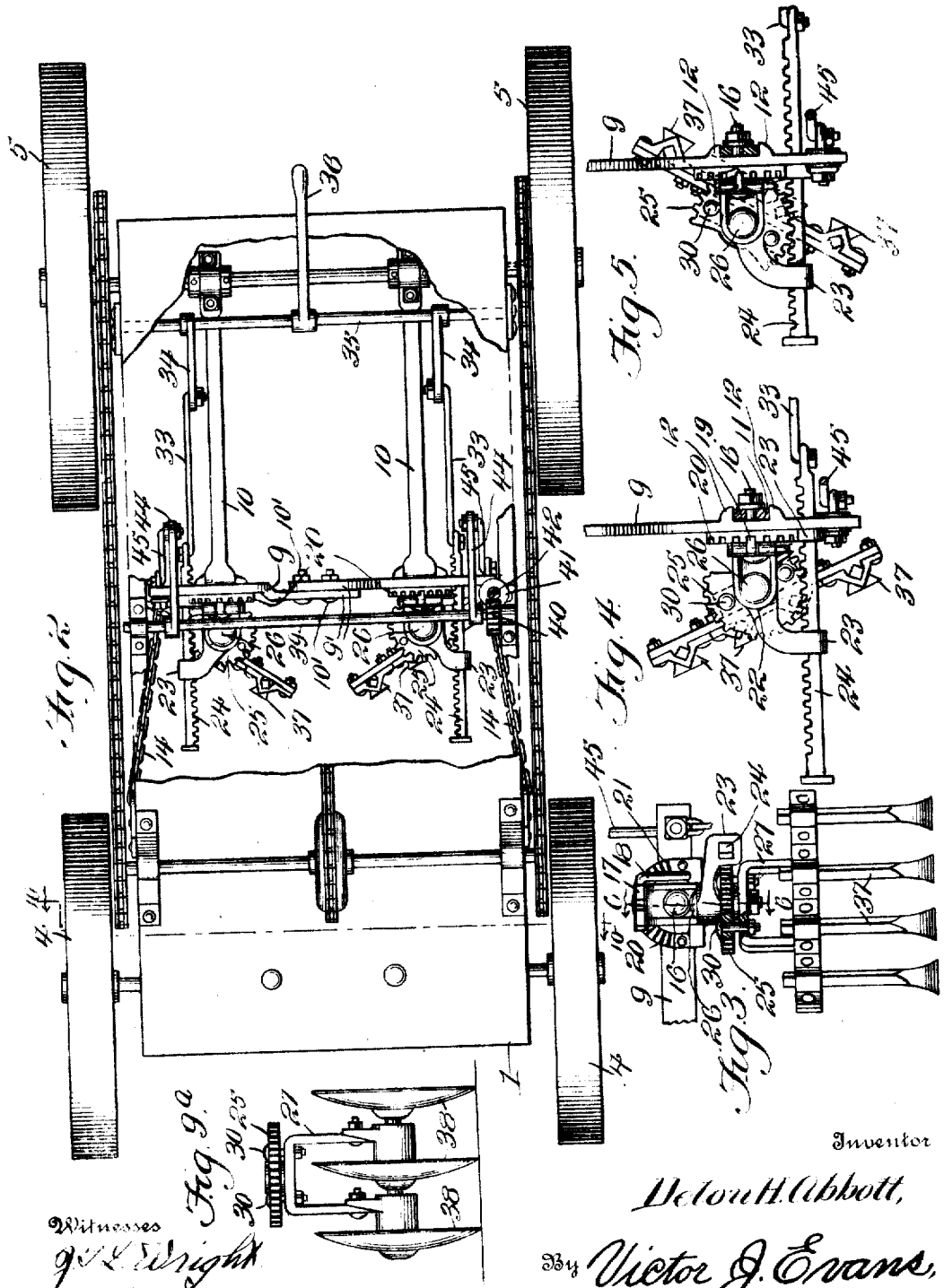
D. H. ABBOTT.
CULTIVATING MACHINE.
APPLICATION FILED MAR. 18, 1911.
1,023,704.
Patented Apr. 16, 1912.
3 SHEETS—SHEET 2.

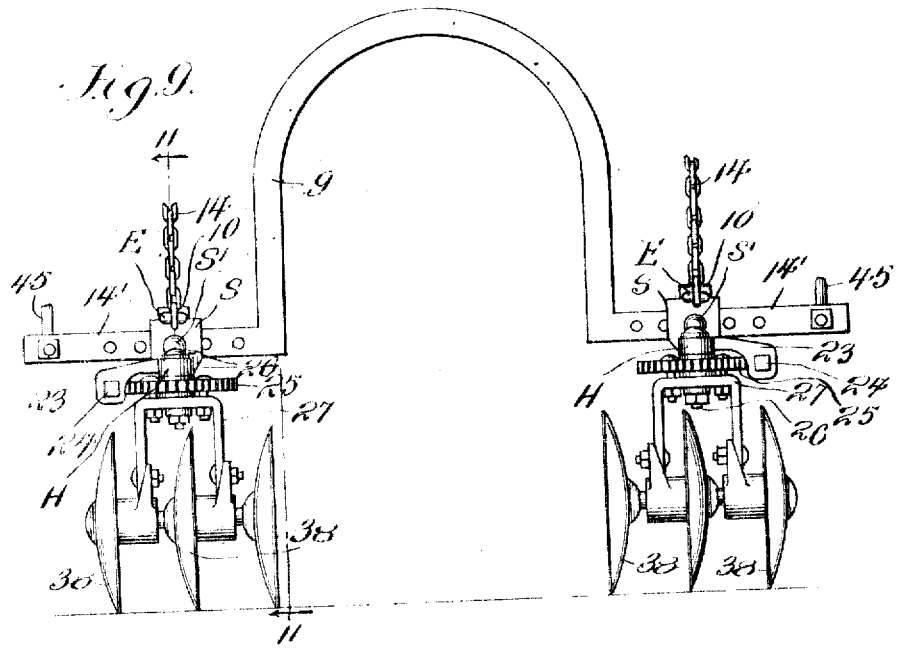
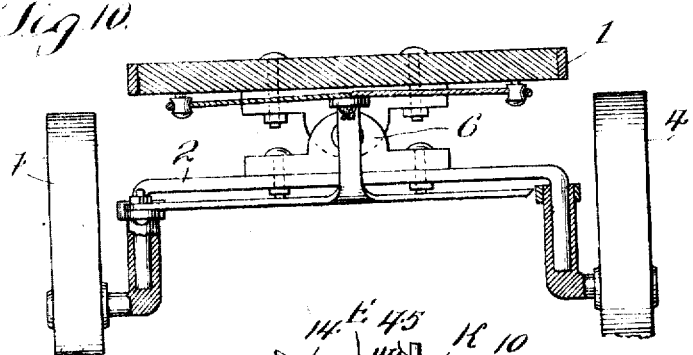
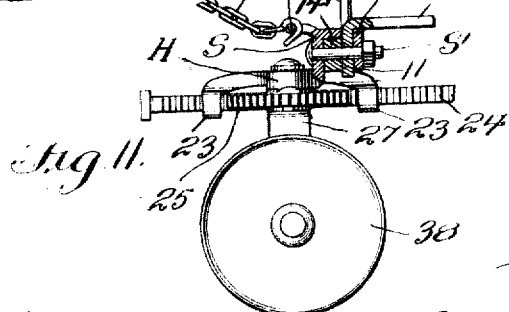

DELON H. ABBOTT, OF VANDEMERE, NORTH CAROLINA.

CULTIVATING-MACHINE.

1,023,704.

Specification of Letters Patent. Patented Apr. 16, 1912.

Application filed March 18, 1911. Serial No. 615,312.

*To all whom it may concern:*

Be it known that I, DELON H. ABBOTT, a citizen of the United States of America, residing at Vandemere, in the county of Pamlico and State of North Carolina, have invented new and useful Improvements in Cultivating-Machines, of which the following is a specification.

This invention relates to agricultural implements and particularly to an improved motor driven machine for operating upon the soil either to prepare the same for the reception of seed or to cultivate the growing plants.

The invention has particular reference to that class of motor driven machines which are provided with reversing gear, enabling the supporting truck or vehicle to be driven in two directions, thereby avoiding the turning about of the machine at the end of a row preparatory to starting in the opposite direction.

The present invention has for its object to provide simple and improved mechanism for reversing the earth-engaging implements at the end of the row, thereby making one set of implements do the work where two sets are usually employed in this class of machines.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a side elevation, partly in section, of a machine constructed in accordance with the invention. Fig. 2 is a top plan view with parts broken away to illustrate the construction, said view being substantially a section taken on the line 2—2 in Fig. 1. Fig. 3 is a sectional elevation showing one of the gang carrying heads and the means for adjusting the same. Fig. 4 is a top plan view of the same. Fig. 5 is a top plan view showing the gang carrying head in reversed position. Fig. 6 is a detail sectional view through one of the gang carrying heads taken on the line 6—6 in Fig. 3. Figs. 7 and 8 are perspective detail views of some of the parts constituting the gang carrying head. Fig. 9 is a detail view of a gang carrying yoke showing gangs of disks connected therewith, and showing a slightly modified construction. Fig. 9ª is a detail front view of one of the disk gangs detached. Fig. 10 is a transverse sectional view taken on the line 10—10 in Fig. 2. Fig. 11 is a sectional detail view taken on the line 11—11 in Fig. 9.

Corresponding parts in the several figures are denoted by like characters of reference.

The body or platform 1 of the improved machine is provided with arch axles 2 and 3 equipped with supporting wheels 4, 5. One of the axles, 2, is suitably supported by means of a rocker iron 6 permitting a swinging movement of the axle in going over rough ground, and suitable steering gear is provided whereby the forward wheels may be adjusted to guide the machine. The wheels 5 upon the axle 3 are driven by a transmission including a chain 7 from a motor 8 supported upon the platform. All these parts may be of conventional or of any suitable construction which may be substantially like that illustrated in Letters Patent No. 962,288, granted to me on the 21st day of June, 1910, although no limitation is made in this respect.

An arch or yoke 9 extends transversely beneath the body or platform 1 between the axles 2 and 3. Said yoke is used to hold the cultivating implements at a uniform distance from each other. In order to allow this distance to be changed, the yoke, as shown in Fig. 2, may be formed of two parts or members having overlapping arms 9', adjustably connected together by means of bolts or similar fastening members, such as 10'. The yoke 9 may be connected with the axle 3 having the driven wheels 5 by means of links 10 having bearings which adjustably engage the axle spindles, said links having terminal hooks 11 which are connected in a manner to be hereinafter described with the yoke which may be provided with keepers or flanges 12 to engage said hooks. The axle 3 will be regarded as the rear axle and will be so described in contradistinction to the front axle 2, although it is understood that the machine may be driven in two directions by the motor, suitable reversing gear being provided for the purpose, as conventionally indicated at 13. The implement carrying yoke is connected with the platform adjacent to the front axle 2 by flexible draft elements, such as chains 14, it being understood that said chains may be connected directly with the implement carrying yoke or with the implement carrying heads mounted upon the latter, as will be presently described.

The implement carrying heads of this device are mounted upon arms 14' extending laterally from the ends of the yoke 9, and said heads, as shown in Figs. 1 to 6, inclusive, may include brackets 15 which are pivotally connected with said yoke by means of pins or bolts 16 which are longitudinally disposed and which extend also through the hooks 11 of the links 10, thereby assembling the parts securely together. Said pins or bolts 16 also constitute pivots about which the arms or brackets 15 may rotate, said arms or brackets being provided with upwardly extending lugs 17 supporting rock shafts 18 having detents 19 adapted to engage rack segments 20 which are associated with the arch 9 for the purpose of maintaining the bracket members 15 in adjusted position with relation to said arch. The rock shafts 18 are each provided with a terminal arm 21 constituting a handle whereby it may be manipulated to disengage the detent 19 from the segment rack 20, thereby enabling the bracket member 15 and the parts associated therewith to be tilted to various adjustments, the parts being retained in adjusted position by the engagement of the detent 19 with the rack segment 20. The handle 21 constitutes a gravity latch whereby the detent upon the rock shaft is maintained in adjusted position with reference to the rack segment.

Each of the bracket members 15 is provided with a forwardly extending vertically apertured arm 22 and with laterally extending longitudinally apertured arms or members 23. The latter arms serve to support and to guide for longitudinal reciprocatory movement a rack bar 24 meshing with a rack segment 25 which is pivoted upon a pin or bolt 26 that extends through the vertically apertured arm 22, said rack segment being intimately associated with an inverted U-shaped gang carrying head 27. The latter, as shown in Fig. 7 of the drawings, may be provided with projections 28 interlocking with recesses 29 in the rack segment 25, which latter may for further security be connected with the head 27 by fastening members, such as rivets 30, passing through alined apertures 31 and 32 in the rack segment 25 and the head 27, respectively, as will be best seen by reference to Figs. 7 and 8 of the drawings. It will be understood, then, that the gang carrying head 27 is rigidly connected with the rack segment 25, and that the latter is in engagement with the longitudinally movable rack bar 24, thus permitting the gang carrying head to be rotated about the axis of the pin or bolt 26 by means of said rack bar. The rack bars 24 associated with the gang carrying heads at the two ends of the arch 9 are connected by links 33 with arms 34 extending from a rock shaft 35 which is fulcrumed upon the base 1, said rock shaft being provided with a lever 36, whereby it may be manipulated to effect the desired adjustment of the gang carrying heads.

Under the modified construction illustrated in Figs. 9 and 11, the implement carrying heads, here designated H, are provided with sleeves S slidably engaging the arms 14' of the yoke 9 upon which said heads may be adjustably mounted by means of bolts or fastening members S' engaging the sleeves S and the arms of the yoke. When this construction is resorted to, the sleeves S may be provided with keepers K for engagement with the hooks 11 upon the connecting links 10 whereby said implement carrying members will be connected with the axle 3. The sleeves S may also be provided with eyes E for engagement with the ends of the flexible connecting members 14.

The earth engaging tools which may consist of blades 37, as shown in Figs. 1, 2, 3, 4 and 5, or which may consist of disks 38, as shown in Fig. 9, or other cultivating implements, are suitably associated with the gang carrying heads 27 upon which they may be mounted in any suitable, convenient and well known manner.

Supported for rotation upon the base or platform 1 of the machine is a shaft 39 having a worm gear 40 meshing with a worm 41 upon an upright shaft 42 having at its upper end a hand wheel 43 whereby it may be manipulated to rotate the shaft 39. The latter is provided with radiating arms 44 connected by links 45 with the ends of the arch 9 which latter, by manipulation of the hand wheel of the shaft 42 may be raised or lowered in an approximately vertical plane, as will be readily understood.

From the foregoing description, taken in connection with the drawings hereto annexed, the operation and advantages of this invention will be readily understood. It will be seen that the wheeled frame of the machine may be propelled in either direction, that is to say, forwardly or rearwardly, and also that it may be guided, as may be required. By manipulating the hand wheel 43 of the shaft 42, the shaft 39 may be oscillated, thus causing the arch 9 equipped with the gang carrying heads to be raised or lowered. When the arch is raised, the machine may be transported from place to place, and while the arch is in raised position it will, furthermore, be seen that by manipulating the lever 36 the rack bars 24 may be moved forwardly or rearwardly, thereby rocking or oscillating the gang carrying heads to present the gangs forwardly or rearwardly, as may be desired. After proper adjustment of the gang-carrying heads, the hand wheel 43 of the shaft 42 may be manipulated to rock the shaft 39 so as to lower the gangs to present the earth-engaging implements for engagement with the ground at the desired depth. When the machine is driven in one direction, stress will be exerted through the links 10 upon the implement carrying parts, thereby forcing the earth engaging implements through the ground. When the machine is driven in the opposite direction, stress will be exerted by the flexible elements 14 upon the implement carrying parts, it being, of course, understood that the elements or chains 14 may be adjusted so as to make them sufficiently taut to operate in the desired manner. Means may be provided for locking the lever 36 and the parts actuated thereby in adjusted position, such means consisting of a stop member of well known form engaging a quadrant supported upon the frame.

As will be seen from the foregoing description, the construction of the improved machine or implement is simple and of such a nature as to enable the parts to be very easily and conveniently manipulated to obtain the most satisfactory results.

Having thus described the invention, what is claimed as new, is:—

1. In a device of the class described, a motor driven frame having arch axles and supporting wheels, means whereby one of said axles is supported for rocking movement, an implement carrying yoke extending beneath the frame intermediate the axles, draft means including links connecting the implement carrying yoke with one axle, flexible elements connecting the implement carrying yoke with the frame in the vicinity of the other, rocking axle, and means for effecting vertical adjustment of the implement carrying yoke.

2. In a device of the class described, a motor driven frame having arch axles and supporting wheels, means whereby one of said axles is supported for rocking movement, an implement carrying yoke extending beneath the frame intermediate the axles, implement carrying heads laterally adjustable on the yoke, draft links slidably engaging the spindles of one axle and having hooks engaging the implement carrying heads, flexible elements connecting said heads with the frame in the vicinity of the other rocking axle, and means for effecting vertical adjustment of the implement carrying yoke.

3. In a device of the character described, a motor driven frame having arched axles and transporting wheels, an arched implement carrying member extending beneath the frame intermediate the axles, means for effecting vertical adjustment of the arch member, draft means connecting the implement carrying member with relatively fixed parts of the frame, oscillatory gang carrying heads associated with the arch member and including segment racks, reciprocatory rack bars engaging the segment racks, and means for actuating the reciprocatory rack bars to rotate the gang carrying heads.

4. In a device of the character described, a motor driven frame including arched axles and transporting wheels, a tool carrying member extending beneath the frame intermediate the axles, means for effecting vertical adjustment of the tool carrying member, means connecting the tool carrying member with relatively fixed parts of the frame, tiltable bracket members adjustably mounted upon the tool carrying member and having guides, rack bars movable in the guides, gang carrying heads associated for oscillation with bracket members and having rack segments connected therewith, said rack segments being in engagement with the rack bars, and means for actuating the rack bars.

5. In a device of the character described, a motor driven frame including arched axles and transporting wheels, a vertically adjustable member connected with the frame and having laterally extending arms, tool carrying heads carried by said arms, draft links connected with one of the axles and having terminal hooks, connecting bolts extending through said hooks and through the tool carrying heads and the arms of the carrying member to assemble said parts, and flexible draft elements connecting the tool carrying heads with the frame in the vicinity of the other axle.

In testimony whereof I affix my signature in presence of two witnesses.

DELON H. ABBOTT.

Witnesses:
J. W. CARRAWAY,
J. L. FOWLER.